(12) United States Patent
Capua et al.

(10) Patent No.: US 11,097,739 B2
(45) Date of Patent: Aug. 24, 2021

(54) METHOD TO ESTIMATE TIRE-ROAD FRICTION, PRIOR TO SAFETY SYSTEMS ENGAGEMENT

(71) Applicant: GM Global Technology Operations LLC, Detroit, MI (US)

(72) Inventors: Alon Capua, Haarhava (IL); Mario Jodorkovsky, Nesher (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 516 days.

(21) Appl. No.: 15/902,637

(22) Filed: Feb. 22, 2018

(65) Prior Publication Data

US 2019/0256103 A1    Aug. 22, 2019

(51) Int. Cl.
| | |
|---|---|
| *B60W 40/068* | (2012.01) |
| *B60W 30/02* | (2012.01) |
| *B60W 30/14* | (2006.01) |
| *B60W 40/076* | (2012.01) |
| *B60W 40/101* | (2012.01) |
| *B60W 40/105* | (2012.01) |
| *B60W 40/109* | (2012.01) |
| *B60W 40/107* | (2012.01) |

(52) U.S. Cl.
CPC .......... *B60W 40/068* (2013.01); *B60W 30/02* (2013.01); *B60W 30/143* (2013.01); *B60W 40/076* (2013.01); *B60W 40/101* (2013.01); *B60W 40/105* (2013.01); *B60W 40/107* (2013.01); *B60W 40/109* (2013.01); *B60W 2520/263* (2013.01); *B60W 2520/266* (2013.01); *B60W 2520/28* (2013.01); *B60W 2530/20* (2013.01); *B60W 2552/15* (2020.02); *B60W 2552/40* (2020.02)

(58) Field of Classification Search
CPC .. B60W 40/068; B60W 30/02; B60W 30/143; B60W 40/076; B60W 40/101; B60W 40/105; B60W 40/109; B60W 40/107; B60W 2552/15; B60W 2552/40; B60W 2520/263; B60W 2520/266; B60W 2520/28; B60W 2530/20; B60W 40/12; B60W 50/14; B60W 2756/10; B60W 2520/105; B60W 2520/125; B60W 40/10; B60W 40/103; B60W 2520/10; B60W 2520/26; G08G 1/096716; G08G 1/096758; G08G 1/096791
USPC .......................................................... 701/80
See application file for complete search history.

(56) References Cited

U.S. PATENT DOCUMENTS

| | | | |
|---|---|---|---|
| 6,508,102 B1* | 1/2003 | Margolis ................. | B60T 8/172 73/8 |
| 2005/0102086 A1* | 5/2005 | Nakao ..................... | B60T 8/172 701/80 |

(Continued)

*Primary Examiner* — Maceeh Anwari
(74) *Attorney, Agent, or Firm* — Cantor Colburn LLP

(57) ABSTRACT

Technical solutions are described for estimating tire-road friction in a vehicle pro-actively, prior to safety systems of the vehicle are engaged. An example method includes computing a slip for the vehicle based on one or more wheel speeds, acceleration, and tire pressure measurement. The method further includes determining a slope ($\alpha$) as indicator of tire-road friction for the vehicle based on the acceleration and the slip. Further, the method includes sending the slope to an autonomous controller of the vehicle for adjusting vehicle kinematics according to the estimated friction using the slope.

15 Claims, 9 Drawing Sheets

(56) References Cited

U.S. PATENT DOCUMENTS

2017/0113702 A1* 4/2017 Thieberger-Navon ........................ B60W 50/0097
2017/0349177 A1* 12/2017 Andersson ............ B60W 30/16

* cited by examiner

US 11,097,739 B2

METHOD TO ESTIMATE TIRE-ROAD FRICTION, PRIOR TO SAFETY SYSTEMS ENGAGEMENT

INTRODUCTION

The subject disclosure relates to vehicles and particularly to a controller of a vehicle to facilitate estimation of a tire-road friction, prior to safety systems engagement, and initiating actions in response.

Motion of a vehicle depends on friction between tires of the vehicle and the road on which the vehicle is traveling. Lack of at least a specific level of friction between the tires and the road is a substantial contributor for accidents. Therefore, an accurate estimate of the tire-road friction facilitates several active vehicle safety functions, such as collision avoidance. For example, if low tire-road friction is detected, speed should be reduced to levels that allow vehicle maneuverability. This helps to possibly avoid a collision and injuries can be reduced. Further, such detection can avoid understeer and oversteer conditions in a vehicle. For example, a vehicle negotiating a curve at high speed can develop an understeer or oversteer situation. In these cases, the vehicle can either fail to follow the lane and leave the road or get into a spin. There are various other advantages/effects of the tire-road friction detection not listed herein.

Accordingly, it is desirable to provide detecting and estimating of tire-road friction in a vehicle and using the estimated tire-road friction to initiate actions to control the vehicle and/or notify an operator of the vehicle.

SUMMARY

In one exemplary embodiment a method is described for estimating tire-road friction in a vehicle pro-actively, prior to safety systems engagement, the method including computing a slip for the vehicle based on one or more wheel speeds, acceleration, and tire pressure measurement. The method also includes determining a slope ($\alpha$) as indicator of tire-road friction for the vehicle based on the acceleration and the slip. The method also includes sending the slope ($\alpha$) to an autonomous controller of the vehicle for adjusting vehicle kinematics according to the slope ($\alpha$).

In one or more examples, the slip is a longitudinal slip computed as $$\frac{\omega R - V}{V}$$

during braking, where V is a vehicle speed, $\omega$ is the wheel speed and R is the effective wheels radius based on the tire pressure measurement and the vehicle's weight. In one or more examples, the longitudinal slip is computed as $$\frac{\omega R - V}{\omega R}$$

during acceleration. Further, in one or more examples, the slip is a lateral slip computed as:

$$-\arctan \frac{\int a_y dt}{|\int a_x dt|},$$

where $a_y$ is the lateral acceleration, and $a_x$ is the acceleration.

In one or more examples, determining the slope includes determining a slope of a line on a plot for the acceleration vs slip, the line being drawn on the plot from the origin to a point represented by present values of the acceleration and the slip.

The method can further include notifying an operator of the vehicle based on the slope prior to the safety system being engaged. The method can further include sending the slope to a second controller associated with a second vehicle. In one or more examples, the method can further include sending the slope to a server computer to warn other vehicles about surface friction.

Further yet, in one or more examples, the method includes indicating a tire-health to an operator of the vehicle based on the slip, the tire-health being deteriorated in response to the slip vs acceleration being below a predetermined safety threshold.

In another exemplary embodiment a system for estimating tire-road friction in a vehicle proactively prior to engagement of a safety system of the vehicle is described. The system includes one or more sensors, and an autonomous controller to maneuver the vehicle autonomously. The system further includes a friction processor coupled with the one or more sensors, and the autonomous controller. The friction processor computes a slip for the vehicle based on one or more wheel speeds, acceleration, and tire pressure measurement. Further, the friction processor determines a slope ($\alpha$) as indicator of tire-road friction for the vehicle based on the acceleration and the slip. Further, the friction processor sends the slope to the autonomous controller of the vehicle for adjusting vehicle kinematics according to the slope.

In one or more examples, the slip is a longitudinal slip computed as $$\frac{\omega R - V}{V}$$

during braking, where V is a vehicle speed, $\omega$ is the wheel speed and R is the effective wheels radius based on the tire pressure measurement and the vehicle's weight. In one or more examples, the longitudinal slip is computed as $$\frac{\omega R - V}{\omega R}$$

during acceleration. Further, in one or more examples, the slip is a lateral slip computed as:

$$-\arctan \frac{\int a_y dt}{|\int a_x dt|},$$

where $a_y$ is the lateral acceleration, and $a_x$ is the acceleration.

In one or more examples, determining the slope includes determining a slope of a line on a plot for the acceleration vs slip, the line being drawn on the plot from the origin to a point represented by present values of the acceleration and the slip.

The system can notify an operator of the vehicle based on the slope prior to the safety system being engaged. The system can further send the slope to a second controller associated with a second vehicle. In one or more examples, the system can further send the slope to a server computer to warn other vehicles about surface friction.

Further yet, in one or more examples, the system indicates a tire-health to an operator of the vehicle based on the slip, the tire-health being deteriorated in response to the slip vs acceleration being below a predetermined safety threshold.

In yet another exemplary embodiment a vehicle controller is described for estimating tire-road friction in a vehicle proactively, prior to engagement of a safety system of the vehicle. The vehicle controller computes a slip for the vehicle based on one or more wheel speeds, acceleration, and tire pressure measurement. Further, the vehicle controller determines a slope ($\alpha$) as indicator of tire-road friction for the vehicle based on the acceleration and the slip. Further, the vehicle controller adjusts, autonomously, vehicle kinematics according to the slope.

In one or more examples, the slip is a longitudinal slip computed as $$\frac{\omega R - V}{V}$$

during braking, where V is a vehicle speed, $\omega$ is the wheel speed and R is the effective wheels radius based on the tire pressure measurement and the vehicle's weight. In one or more examples, the longitudinal slip is computed as $$\frac{\omega R - V}{\omega R}$$

during acceleration. Further, in one or more examples, the slip is a lateral slip computed as:

$$-\arctan\frac{\int a_y dt}{|\int a_x dt|},$$

where $a_y$ is the lateral acceleration, and $a_x$ is the acceleration.

In one or more examples, determining the slope includes determining a slope of a line on a plot for the acceleration vs slip, the line being drawn on the plot from the origin to a point represented by present values of the acceleration and the slip.

The vehicle controller can further notify an operator of the vehicle based on the slope prior to the safety system being engaged. The vehicle controller can further send the slope to a second controller associated with a second vehicle. In one or more examples, the vehicle controller can further send the slope to a server computer to warn other vehicles about surface friction.

Further yet, in one or more examples, the vehicle controller indicates a tire-health to an operator of the vehicle based on the slip, the tire-health being deteriorated in response to the slip vs acceleration being below a predetermined safety threshold.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
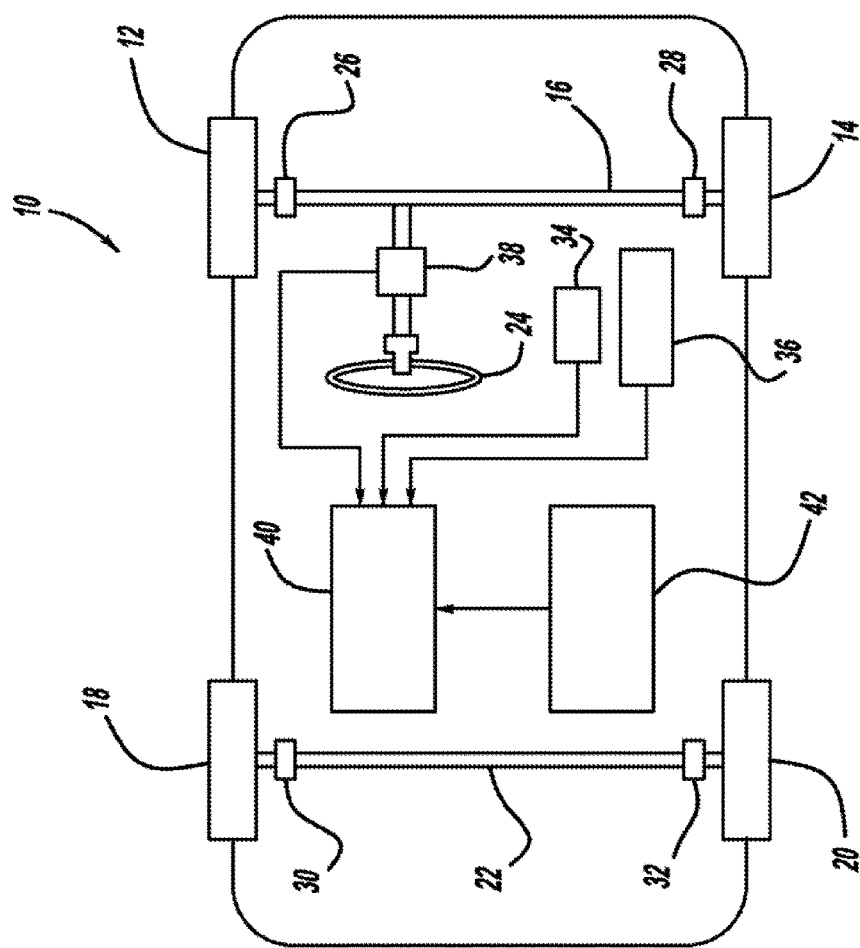
FIG. 1 is a schematic plan view of a vehicle including a vehicle stability control system and a processor for estimating surface coefficient of friction according to one or more embodiments.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

As described earlier, for a vehicle in motion, tire-road friction being below a predetermined threshold can be a predominant cause of accidents. The tire-road friction may be represented by a tire-road friction coefficient. Estimating the tire-road friction coefficient accurately is a technical challenge. Further, estimating the tire-road friction coefficient accurately at low cost (without additional sensors) is a technical challenge. Further yet, typically in modern vehicles, upon experiencing a slip, or change in tire-road friction, a safety system of the vehicle, such as an active braking system or any other, is activated, which changes the tire-road friction value because of the action(s) of the safety system.

The technical solutions described herein address such technical challenges and facilitate estimating the tire-road friction at a low cost, and prior to the safety systems of the vehicle being engaged. This allows the vehicle to operate in the linear part of its characteristics, instead of applying safety systems that work on the non-linear part of the characteristics. The technical solutions thus provide a proactive approach in lieu of a reactive one. Further, the technical solutions described herein facilitate avoiding accidents caused by low tire-road friction by providing implementation of an Advanced Driver Assistance System (ADAS) based on a detection of loss of tire-road friction. For example, the ADAS may be an automated vehicle controller that maneuvers the vehicle based on the detected tire-road friction coefficient value(s), such as by adjusting kinematics of the vehicle. Further yet, in one or more examples, the ADAS facilitates notifying an operator of the vehicle about/based on a change in the tire-road friction coefficient value(s).

In one or more examples, the technical solutions facilitate estimating the tire-road friction before safety systems engage, based on estimating a longitudinal slip or side-slip and measuring a longitudinal and/or lateral acceleration. The estimate is used as a predictor for safety systems and for adjusting kinematics of the vehicle.

In accordance with an exemplary embodiment, FIG. 1 is a schematic plan view of a vehicle including a vehicle stability control system and a processor for estimating surface coefficient of friction according to one or more embodiments. The surface coefficient of friction represents the tire-road coefficient of friction. As depicted, a vehicle 10 includes front wheels 12 and 14 connected by a front axle 16 and rear wheels 18 and 20 connected by a rear axle 22. A steering wheel 24 steers the front wheels 12 and 14. A wheel speed sensor 26 measures the speed of the front wheel 12, a wheel speed sensor 28 measures the speed of the front wheel 14, a wheel speed sensor 30 measures the speed of the rear wheel 18 and a wheel speed sensor 32 measures the speed of the rear wheel 20. A tire pressure monitor system (TPMS) 34 measures the tire-pressure of the wheels 12, 14 (and others), an acceleration sensor 36 measures the longitudinal and lateral acceleration of the vehicle 10 and a suspension deflection sensor 38 measures the suspension, deflection, or deflection rate, of the suspension. A controller 40 provides vehicle control, such as vehicle stability control, and is intended to represent any suitable vehicle controller that makes use of the surface coefficient of friction μ. In one or more examples, the controller 40 is the ADAS that maneuvers the vehicle 10 autonomously.

A coefficient of friction processor 42 estimates the coefficient of friction μ of the surface that the vehicle 10 is traveling on, as will be discussed in detail below.

Figure 2:
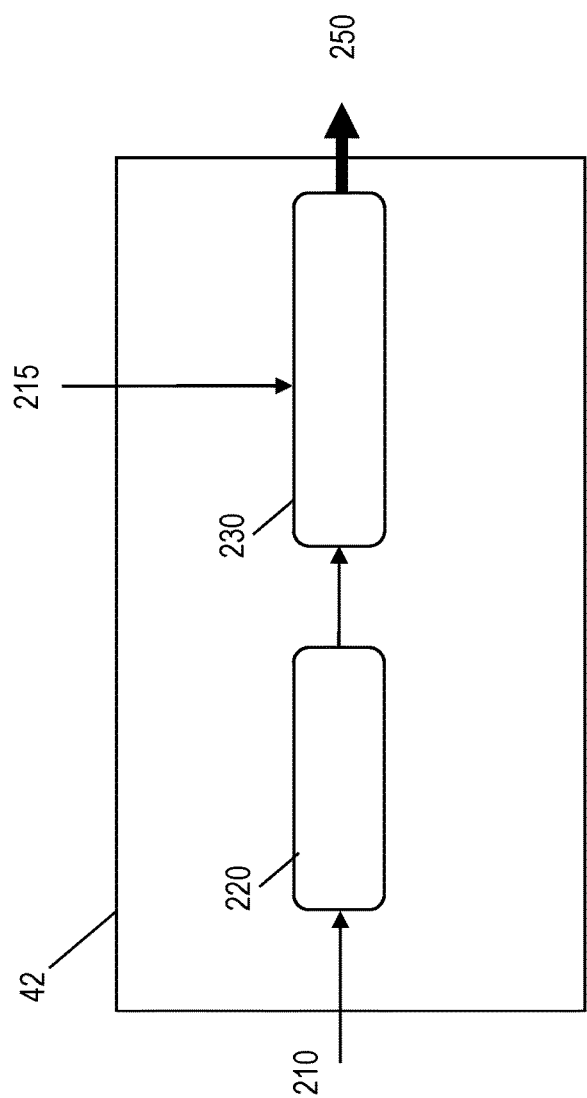
FIG. 2 depicts a block diagram of the friction processor according to one or more embodiments.

FIG. 2 depicts a block diagram of the friction processor 42 according to one or more embodiments. The friction processor 42 includes a slip estimator 220 and an acceleration-slip module 230, among other components.

The slip estimator 220 computes the slip of the vehicle 10 based on one or more sensor inputs 210. The sensor input 210 includes a wheel speed, a tire pressure, and a vehicle speed. In one or more examples, the input 210 further includes suspension deflection rate. In one or more examples, the slip estimator 220 computes a longitudinal slip of the vehicle 10 based on one or more sensor inputs 210. The longitudinal slip is computed during braking as follows—

$$\text{Longitudinal slip} = \frac{\omega R - V}{V}$$

Here, V is the longitudinal vehicle speed, ω is the wheel speed, and R is an effective value of the vehicle's wheel radius. During acceleration the longitudinal slip is computed as follows:

$$\text{Longitudinal slip} = \frac{\omega R - V}{\omega R}$$

The vehicle speed V can be estimated and/or received from a speed sensor (not shown) of the vehicle 10. Alternatively, or in addition, the vehicle's longitudinal speed V may be received from the controller 40. Further, the wheel speed ω is received from the sensors. The vehicle's effective wheel radius R is calculated based on an estimated payload using the tire pressure input received, a known vertical tire stiffness value, and a known base weight of the vehicle 10. The longitudinal slip varies according to the payload and tire pressure of the vehicle 10.

The acceleration-slip module 230 receives the slip computed by the slip estimator 220 and computes a slope (α) 250, which is proportional to the friction coefficient (μ); a second slip-value, which may be a side-slip or lateral slip of the vehicle 10. In one or more examples, the acceleration-slip module 230 receives both, lateral slip and longitudinal slip for the vehicle 10, and computes two slope values—a first slope using longitudinal slip v. longitudinal acceleration, and a second slope using lateral slip v. lateral acceleration. Further, friction coefficients are computed using each of the slope values, a first friction coefficient based on the first slope and a second friction coefficient based on the second slope. Depending on whether longitudinal or the lateral motion of the vehicle 10 being dominant, the corresponding friction coefficient is used. The acceleration-slip module 230 further receives a longitudinal and lateral acceleration value(s) 215 from the one or more sensors of the vehicle 10. The acceleration-slip module 230 computes the tire-road friction coefficient based on the received input values. In one or more examples, the acceleration-slip module 230 computes the slope (α) 250 by projecting the received input to an acceleration vs slip plane.

Figure 3:
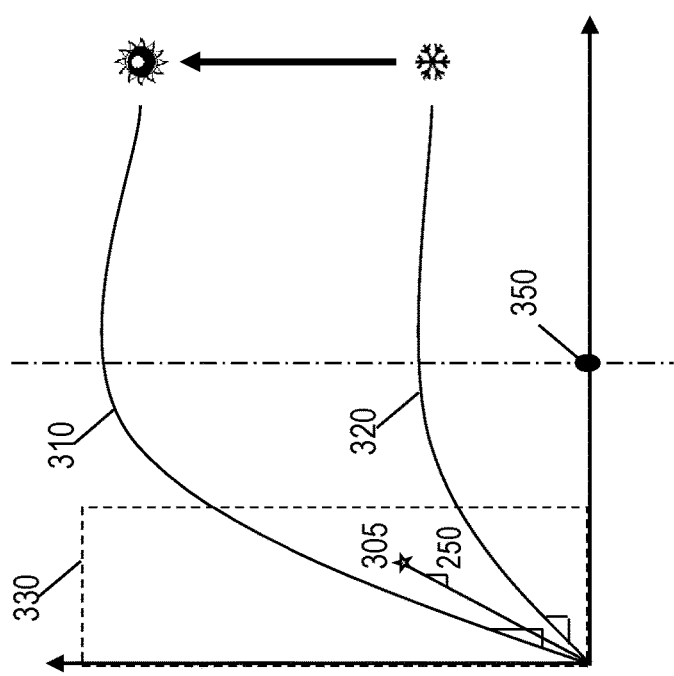
FIG. 3 depicts an example acceleration vs slip plane according to one or more embodiments.

FIG. 3 depicts an example acceleration vs slip plane according to one or more embodiments. It should be noted that the depicted plane is one example, and that in other embodiments, the acceleration vs slip plane can be different. Further, the acceleration vs slip plane is a visual representation of a look up table that stores the longitudinal and lateral acceleration and slip values. The acceleration vs slip plane represents the longitudinal and/or lateral slip values on the X-axis and the longitudinal and/or lateral acceleration values on the Y axis.

The acceleration-slip module 230 plots a point 305 on the acceleration vs slip plane based on the computed longitudinal slip and the received longitudinal acceleration values, as shown. In a similar manner a point 305 is plotted using the lateral slip and lateral acceleration. Measuring the slope from the origin to that point 305 results in a straight line, and a slope 250 of that line is proportional to the tire-road friction coefficient (μ). The grater the slope, the higher is the value of μ. The slope value 250 is thus a surface coefficient indicator, or a tire-road friction coefficient parameter. The acceleration-slip module 230 uses either the point 305 based on the longitudinal values or the lateral acceleration based on which of the two types is more dominant. For example, if the vehicle is traveling substantially along a straight line, the longitudinal acceleration and longitudinal slip values may be dominant; when the vehicle is traveling along a curve, for example making a turn, the lateral acceleration and lateral slip values may become dominant. Alternatively, in one or more examples, both, the lateral and longitudinal slip values are computed. Further, it is determined which one yields a lower friction coefficient value, the longitudinal slip or the lateral slip. The dominant of the two friction coefficient values is used to adjust the vehicle dynamics and/or to determine the road type.

The acceleration-slip module 230 computes the side-slip as follows—

$$\alpha = -\arctan\frac{\int a_y dt}{|\int a_x dt|}$$

Here, $a_y$ and $a_x$ are the lateral and longitudinal acceleration respectively.

The acceleration-slip module 230, in one or more examples, stores/accesses predetermined values that represent road conditions with tire-road friction coefficient indicator above a predetermined threshold representing excellent driving conditions, for example, sunny weather, dry road surface, etc., represented by curve 310 in FIG. 3. Further, the curve 320 depicts driving conditions with surface coefficient indicator below a predetermined threshold indicative of a surface coefficient representative of an icy surface. It should be noted that the predetermined values for types of road conditions other than those depicted by curves 310 and 320 may also be stored.

Further, the acceleration-slip module 230 determines the slope 250 in a linear range of the relation between the longitudinal/lateral acceleration and the longitudinal/lateral slip. The linear range of the relation is depicted by the region 330 in FIG. 3, and is defined using a first predetermined threshold of the slip value, and a second predetermined threshold of the longitudinal/lateral acceleration value. The first and second thresholds are values that contain the region 330 in the linear region, which is before the engagement of the safety systems of the vehicle, for example at slip value 350. Accordingly, the acceleration-slip module 230 computes the slip 250 as an indicator of the tire-road friction coefficient ($\mu$) prior to the engagement of the safety systems, because the friction coefficient is a function of the vehicles weight and tire parameters.

Figure 4:
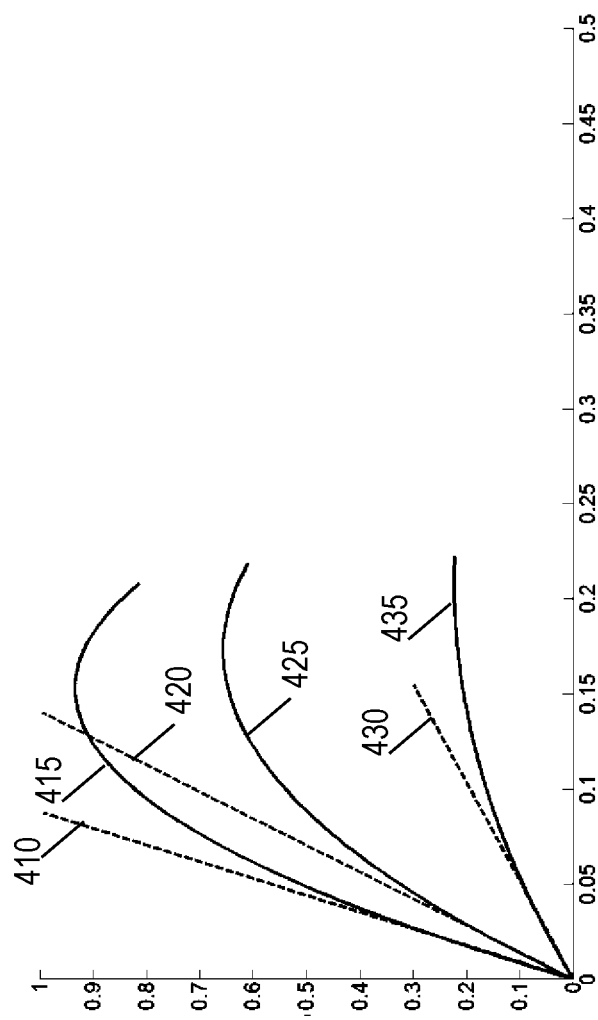
FIG. 4 depicts an example plot illustrating the slip computed for different types of road surfaces according to one or more embodiments.

FIG. 4 depicts an example plot illustrating slip computation for different types of road surfaces according to one or more embodiments. In FIG. 4, the X-axis has slip values and the Y-axis has longitudinal acceleration values. The example data illustrated in FIG. 4 is just one example and different results may be obtained in different embodiments. Further, in the illustrated examples, the vehicle payload is constant. FIG. 4 depicts a first line 410 with a first side-slip (slope=11.3) corresponding to a first curve 415 for a dry surface. Further, a second line 420 with a second side-slip (slope=7.1) is shown corresponding to a second curve 425 for a wet surface. Further yet, a third line 430 with a third slip (slope=1.93) is shown corresponding to a third curve 435 for a slippery surface, such as an icy road. It should be understood that the values in the above example scenario are exemplary, and that in other example scenarios, the values may be different. It can be seen that based on the computed slip, a type of the road surface, and particularly a tire-road coefficient can be estimated. Further, it can be seen that the slip is determined in the linear region of the respective curves (415, 425, and 435), prior to the engagement of the safety systems.

Figure 5:
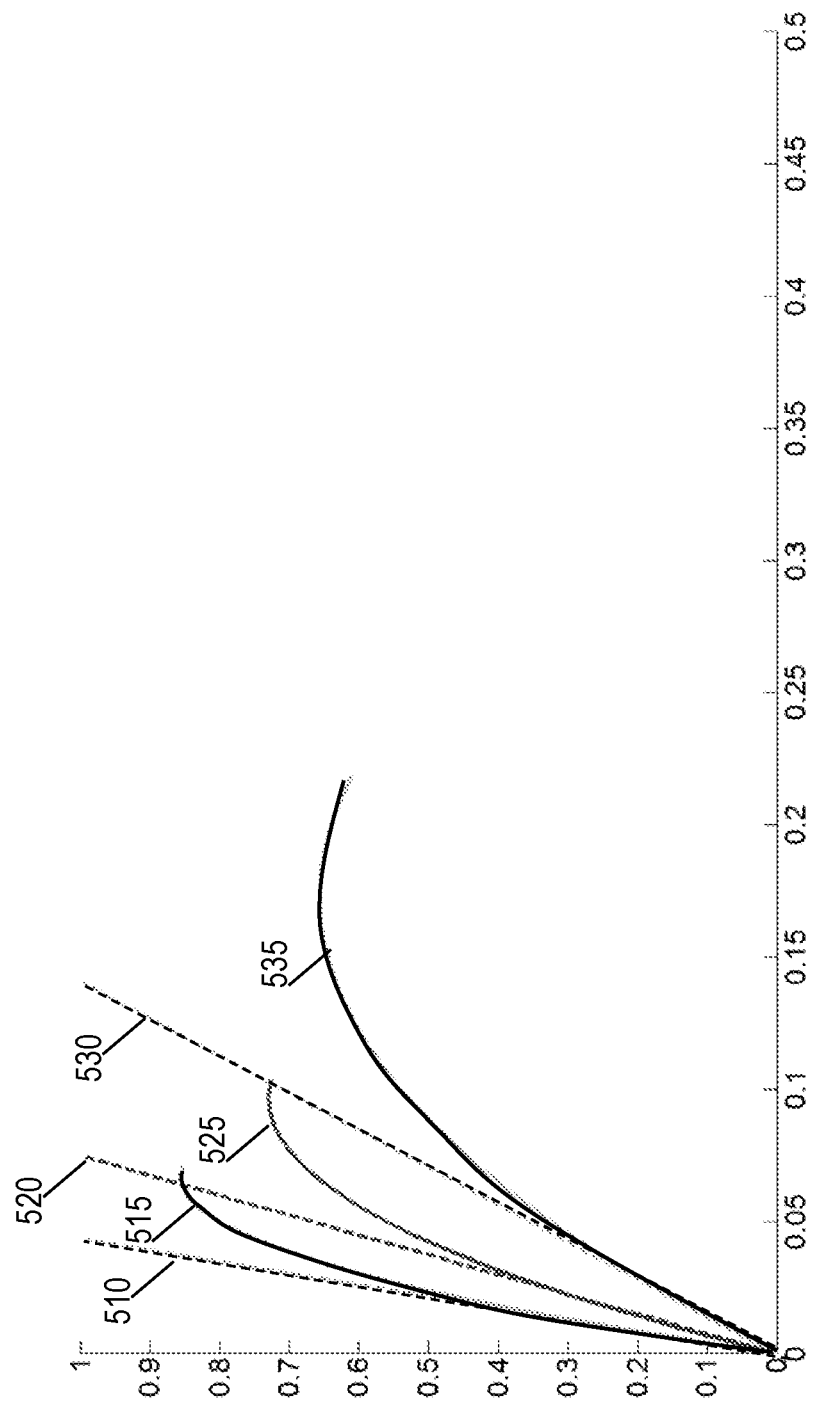
FIG. 5 depicts an example plot illustrating the slip computed for a road surface at different payloads according to one or more embodiments.

FIG. 5 depicts an example plot illustrating the slip 250 computed for a road surface at different payloads according to one or more embodiments. In FIG. 5, the X-axis has slip values and the Y-axis has acceleration values. The values may be longitudinal acceleration and longitudinal slip, or lateral acceleration and lateral slip values. The data illustrated in FIG. 5 is just one example and different results may be obtained in different embodiments. Further, in the illustrated examples, the road surface is constant (in this case a wet surface is depicted) and the payload of the vehicle 10 is varied. FIG. 5 depicts a first line 510 with a first slip (slope=23) corresponding to a first curve 515 for a first payload (R=400 kg). Further, a second line 520 with a second slip (slope=13.3) is shown corresponding to a second curve 525 for a second payload. Further yet, a third line 530 with a third slip (slope=7.1) is shown corresponding to a third curve 535 for a third payload. It should be understood that the values in the above example scenario are exemplary, and that in other example scenarios, the values may be different. It can be seen that based on the computed slip, a type of the road surface, and particularly tire-road coefficient can be estimated.

Figure 6:
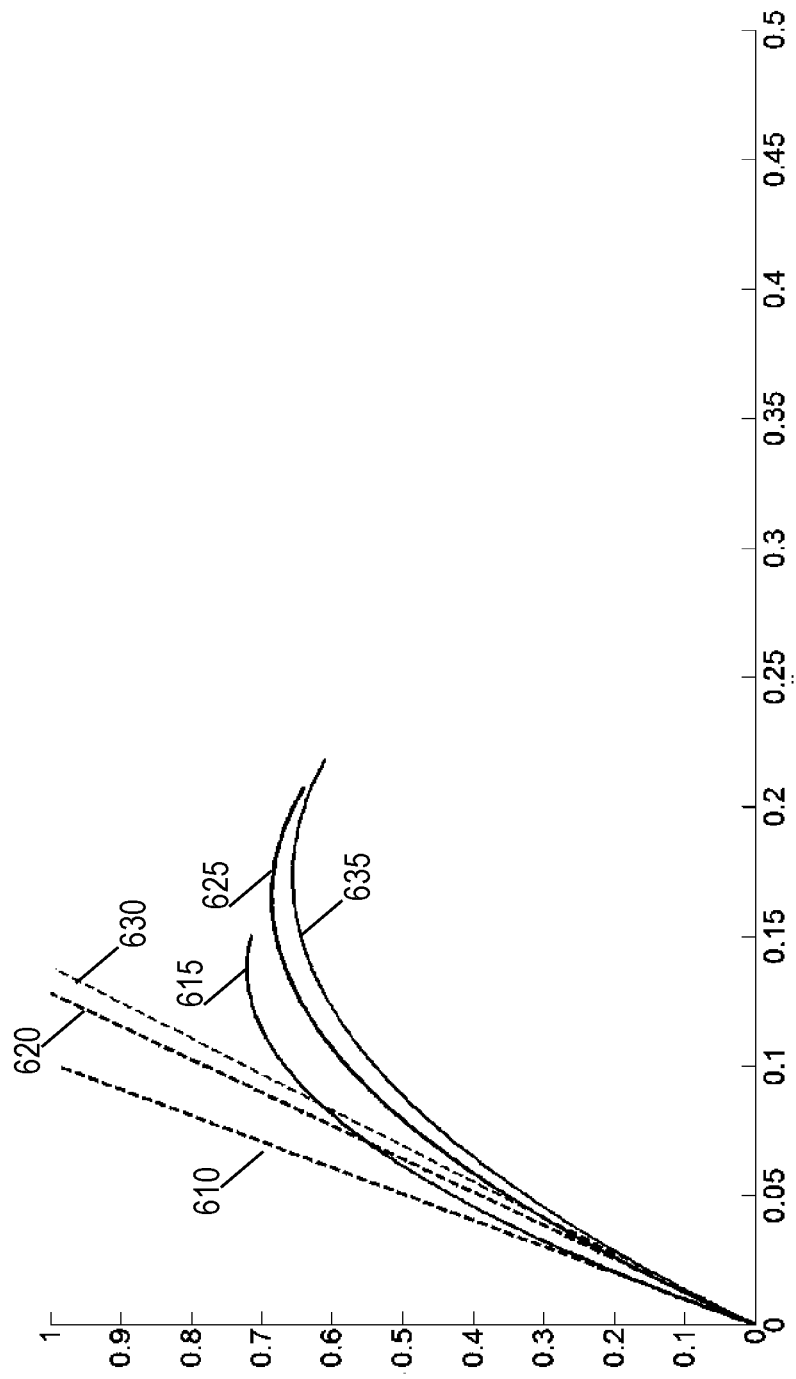
FIG. 6 depicts an example plot illustrating the slip computed for a road surface at different tire pressures according to one or more embodiments.

FIG. 6 depicts an example plot illustrating the slip 250 computed for a road surface at different tire pressures according to one or more embodiments. In FIG. 6, the X-axis has slip values and the Y-axis has acceleration values. The values may be longitudinal acceleration and longitudinal slip, or lateral acceleration and lateral slip values. The data illustrated in FIG. 6 is just one example and different results may be obtained in different embodiments. Further, in the illustrated examples, the road surface is constant (in this case a wet surface is depicted) and the payload of the vehicle 10 is also maintained constant, and the tire pressure is varied. FIG. 6 depicts a first line 610 with a first slip (slope=9.89) corresponding to a first curve 615 for a first tire-pressure (low). Further, a second line 620 with a second slip (slope=7.8) is shown corresponding to a second curve 625 for a second tire-pressure (medium). Further yet, a third line 630 with a third slip (slope=7.23) is shown corresponding to a third curve 635 for a third tire-pressure (high). It should be understood that the values in the above example scenario are exemplary, and that in other example scenarios, the values may be different. It can be seen that based on the computed side-slip, a type of the road surface, and particularly tire-road coefficient can be estimated.

Figure 7:
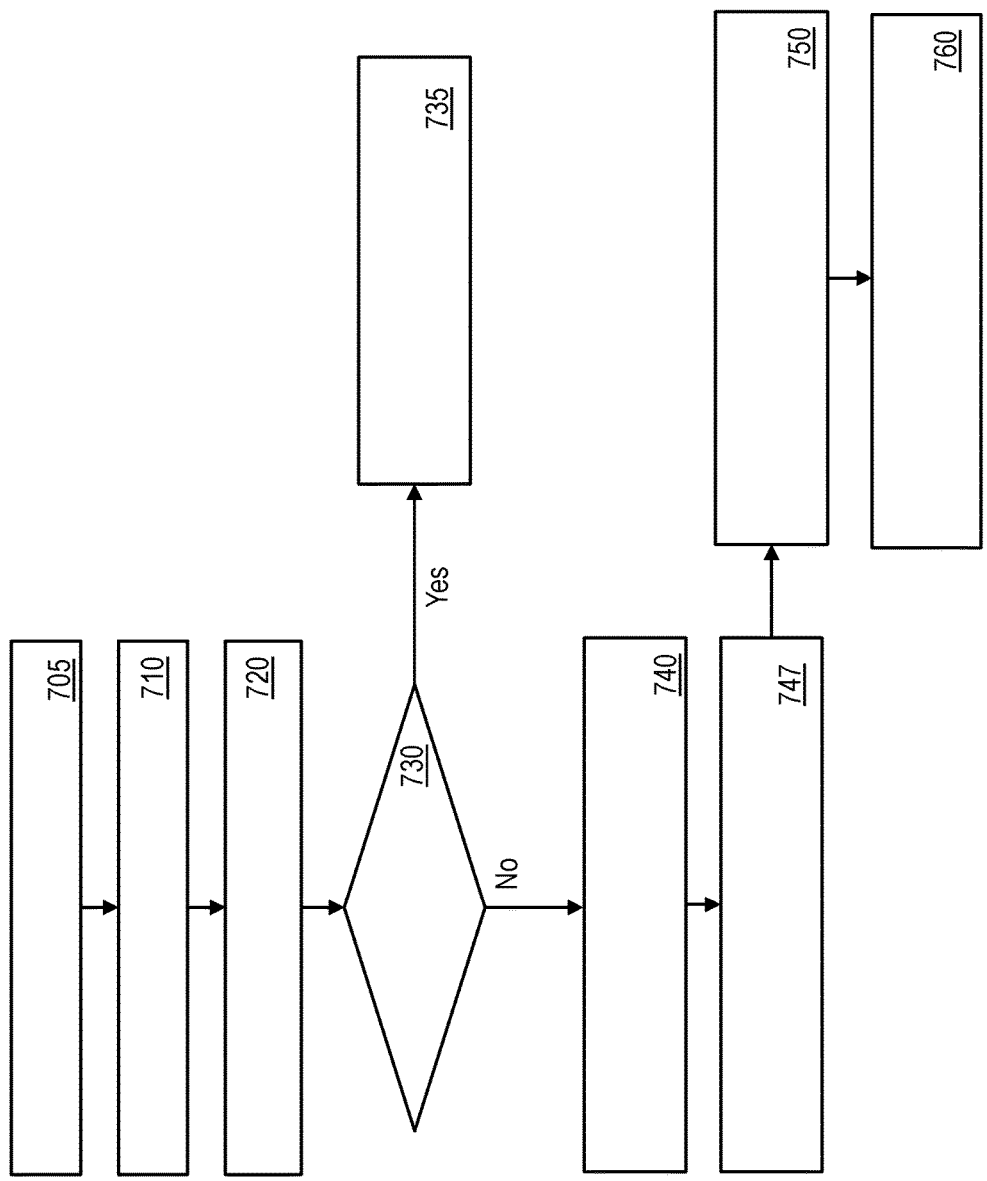
FIG. 7 depicts a flowchart for estimating a tire-road surface friction prior to engagement of safety systems of a vehicle according to one or more embodiments.

FIG. 7 depicts a flowchart for estimating a tire-road surface friction prior to engagement of safety systems of a vehicle according to one or more embodiments. The method may be implemented by the vehicle 10 using the ADAS controller 40 and the friction processor 42. The friction processor receives the inputs 210 from the one or more sensors of the vehicle, at 705. The inputs include the wheel speed ($\omega$), and the vehicle speed (V), longitudinal and lateral accelerations, and the vehicle payload estimate among others.

Further, the friction processor 42 computes the longitudinal slip and lateral slip using the inputs 210, at 710. The computation is performed using the equations described herein. The friction processor 42 further receives measured values for a lateral acceleration and a longitudinal acceleration, for example from one or more sensors and/or the ADAS controller 40, at 720.

The method further includes determining if the safety system of the vehicle 10 has engaged, at 730. If the safety system has not yet engaged, the slip and acceleration values (longitudinal and/or lateral) are in the predetermined linear region 330. If the safety system is engaged, the vehicle is maneuvered according to the engaged safety system, at 735.

Here, the driver or autonomous vehicle attempts to get out of this extreme situation by carefully adjusting the vehicle kinematics.

If the safety system has not engaged, friction processor 42 computes the slope (α) 250 using both sets of values, the lateral values and the longitudinal values, at 740. That is, the friction processor 42 computes both, the lateral slip and the longitudinal slip; the friction processor 42 measures the longitudinal acceleration and lateral acceleration; and the friction processor determines a first slope for longitudinal slip v. longitudinal acceleration and a second slope for lateral slip v. lateral acceleration. The friction processor 42 determines the friction coefficient values using both the slope values (α) 250. Further, the friction processor determines which of the two friction coefficients is more dominant, at 747. For example, if the vehicle 10 is traveling along a straight path, the friction coefficient using the longitudinal acceleration is dominant, while if the vehicle 10 is traveling along a curve, the friction coefficient using the lateral acceleration is dominant. In one or more examples, the lower friction coefficient value is considered more dominant, in the case where there is no substantial difference between the accelerations along the longitudinal and lateral axes. The substantial difference may be determined by comparing the difference with a threshold. In the case the acceleration difference is substantial (above the threshold), the axes with the higher acceleration value is the dominant axis, and the computations are performed using the dominant acceleration.

The friction processor estimates the road surface friction and/or road surface type based on the dominant friction coefficient, at 750. For example, the friction coefficient is compared with predetermined values for known tire-road friction conditions, such as dry asphalt, wet asphalt, ice, and others.

The friction processor 42 indicates the identified road surface type and/or road surface friction coefficient based on the slope (α) 250, to the ADAS controller 40. In one or more examples, the controller 40 adjusts kinematics of the vehicle 10 (gas, brake, powertrain and steering) based on the estimated road surface friction, at 760. For example, the controller 40 adjusts the trajectory of the vehicle 10, the trajectory being the path along which the vehicle 10 is moving. For example, the wheel speed may be reduced, the steering wheel may be turned to change the angle of the tires, and the like. Alternatively, or in addition, operating parameters of a traction control system (not shown) of the vehicle 10 are adjusted according to the estimated road surface friction. For example, if the road surface is estimated to be a wet surface, the traction control system may be adjusted to provide additional traction to the wheels to avoid slipping. Further, in one or more examples, the kinematics adjustments include reducing the vehicle speed and limiting the vehicle's lateral maneuvers. For example, the controller 40 sends commands to gas, brake, and powertrain actuators for adjusting the kinematics of the vehicle 10.

It should be noted that the adjustment to the kinematics are performed based on the specific situation of the vehicle 10, such as the tire pressure and the payload. For example, as part of the kinematics adjustment, a first vehicle may adjust the wheel speed to a first value in response to an estimated side-slip X, and a second vehicle may adjust the wheel speed to a second value, distinct from the first value in response to the same estimated side-slip X. The two vehicles may have a different adjustment because the tire-pressures are different, or the payloads are different, and/or the tire conditions (old/new) are different. In one or more examples, the adjustment is performed to change the side-slip of the vehicle 10 within a specific range, such as the linear range 330.

Further, in one or more examples, the ADAS controller 40 facilitates providing the estimated side-slip to other vehicles, for example vehicles that are scheduled to travel along the surface that is being presently evaluated by the vehicle 10. For example, the controller 40 forwards the estimated road surface type to a server computer (not shown) via a communication network. The server computer, in turn, informs the other vehicles. Alternatively, or in addition, the ADAS controller 40 of the vehicle 10 broadcasts the estimated road surface type using an inter-vehicle communication network to one or more neighboring vehicles. The other vehicles can perform adjustments to their respective kinematics based on the received road surface type information from the vehicle 10.

Accordingly, the friction processor 42 computes a side-slip 250 based on longitudinal slip and a lateral acceleration to estimate a road surface friction, and the estimate is used to adjust vehicle kinematics, for example, in an autonomous vehicle. In one or more examples, an operator/occupant of the vehicle 10 is notified of the estimated road surface, and in response, the operator/occupant may maneuver the vehicle 10. For example, an occupant may take over control of the vehicle 10 from the autonomous ADAS system. Alternatively, or in addition, an operator may alter the course of the vehicle, change the vehicle speed, or take any other action according to the road surface friction estimated.

Further, according to one or more embodiments, the computation of the slope (α) 250 is used to determine a condition of the tires of the vehicle 10.

Figure 8:
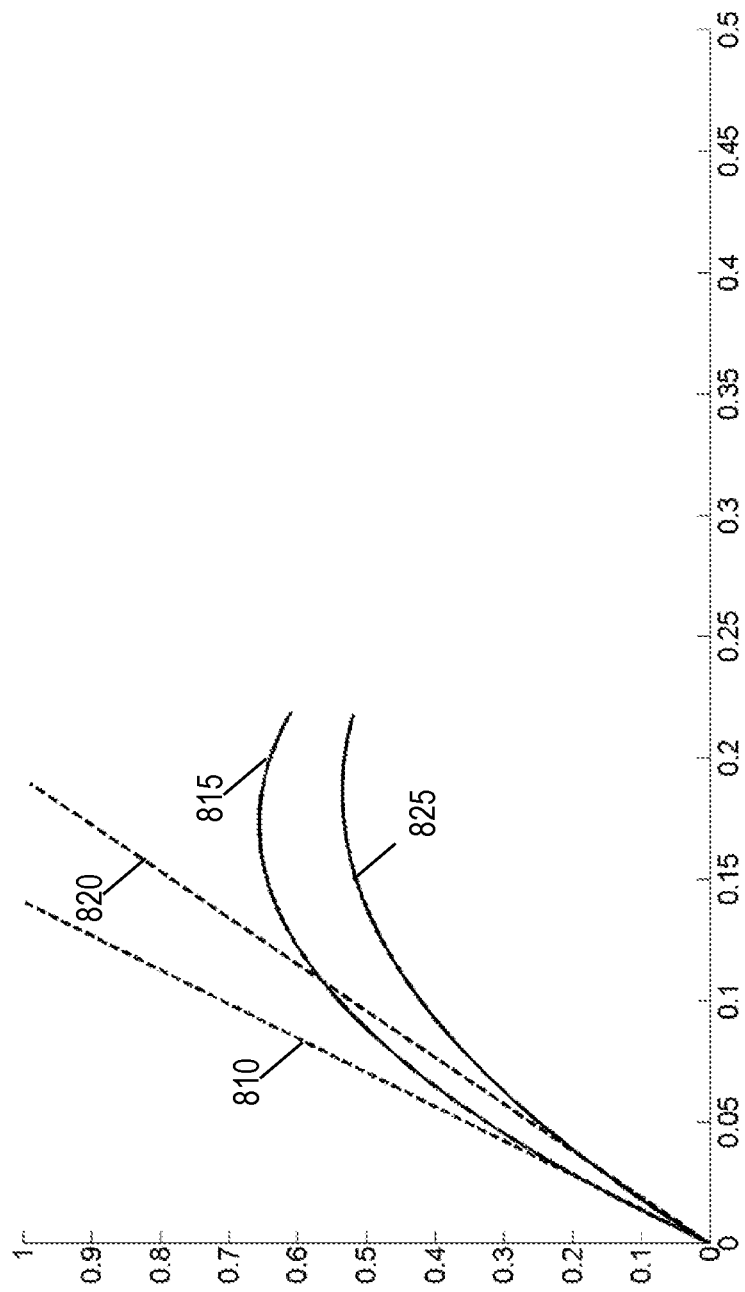
FIG. 8 depicts an example plot illustrating the slip computed for a tires at different ages according to one or more embodiments.

FIG. 8 depicts an example plot illustrating the slip computed for tires at different ages according to one or more embodiments. In FIG. 8, the X-axis has slip values and the Y-axis has acceleration values. The values may be longitudinal acceleration and longitudinal slip, or lateral acceleration and lateral slip values. The data illustrated in FIG. 8 is just one example and different results may be obtained in different embodiments. Further, in the illustrated examples, the tire condition is varied. FIG. 8 depicts a first line 810 with a first slip (slope=7.1) corresponding to a first curve 815 for new tires. Further, a second line 820 with a second slip (slope=5.21) is shown corresponding to a second curve 825 for older tires. It should be understood that the values in the above example scenario are exemplary, and that in other example scenarios, the values may be different. Based on the computed slip 250, the controller 40 determines if the tires are older/newer and if the slope (α) 250 falls below a predetermined safety threshold, the controller 40 informs the occupant/user of the vehicle 10 to change the tires. In one or more examples, if the vehicle 10 is autonomous, the controller 40 maneuvers the vehicle 10 to a service facility for a tire change.

Figure 9:
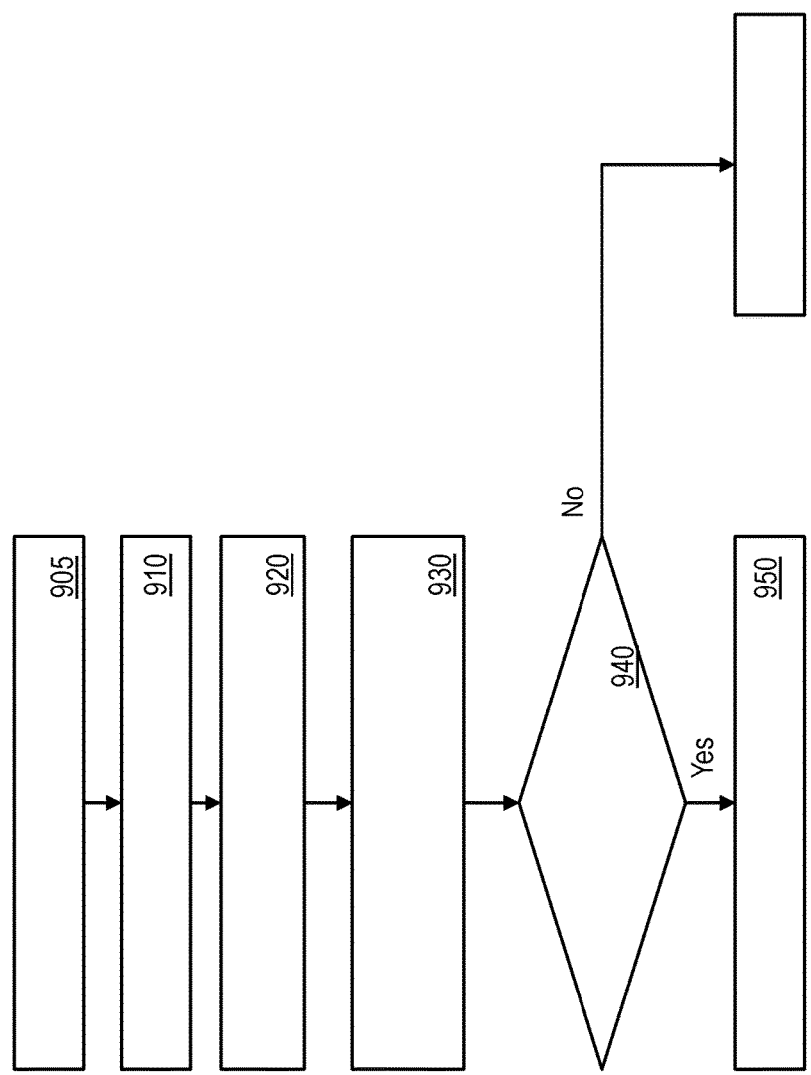
FIG. 9 depicts a flowchart for determining tire health based on slip and maneuvering a vehicle based on the tire health according to one or more embodiments.

FIG. 9 depicts a flowchart for determining tire health based on a slope (α) 250 and maneuvering a vehicle based on the tire health according to one or more embodiments. The method includes receiving the inputs 210 from the one or more sensors of the vehicle 10, at 905. Further, the method includes computing a slip based on the input 210, at 910. In one or more examples, both longitudinal slip and lateral slip values may be computed. Further yet, the method includes receiving a acceleration value(s) from the one or more sensors of the vehicle 10, at 920. In one or more examples, both, longitudinal acceleration and lateral acceleration values are measured. The method further includes computing the slope (α) 250 using the slip and the acceleration, at 930. As described herein, the slope 250 is computed using the dominant from among the lateral and the longitudinal values. The slope 250 is computed only when the vehicle 10 is operating in a predetermined condition range, such as the linear range 330. The vehicle 10 is determined to be operating in the linear range 330 if the safety system of the vehicle 10 has not yet engaged.

The method further includes comparing the computed slope ($\alpha$) 250 with a safety threshold value, at 940. The safety threshold value is indicative of a recommended safety level for the tire health, such as the tread of the tires. If the slope ($\alpha$) 250 is below the safety threshold, the controller 40 takes a tire-safety action, at 950, and continues to operate without such an action if the slope ($\alpha$) 250 is above the safety threshold (or equal to). The tire-safety action may include notifying the occupants/operator/user/owner of the vehicle 10 of the tire health being below the recommended safety condition. Alternatively, or in addition, the tire-safety action may include maneuvering the vehicle 10, autonomously, to a service center for tire repair/replacement.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method for estimating tire-road friction in a vehicle proactively, prior to safety systems engagement, the method comprising:
   computing a slip for the vehicle based on one or more wheel speeds, acceleration, and tire pressure measurement, wherein the slip is a longitudinal slip computed as $$\frac{\omega R - V}{V}$$

during braking, and as $$\frac{\omega R - V}{\omega R}$$

during acceleration, where V is a vehicle speed, $\omega$ is the wheel speed and R is the effective wheels radius based on the tire pressure measurement and the vehicle's weight;
   determining a slope ($\alpha$) as indicator of tire-road friction for the vehicle, the slope ($\alpha$) being based on the acceleration and the slip; and
   causing an autonomous controller of the vehicle to adjust vehicle kinematics according to the slope ($\alpha$).

2. The method of claim 1, wherein determining the slope comprises determining a slope of a line on a plot for the acceleration vs slip, the line being drawn on the plot from the origin to a point represented by present values of the acceleration and the slip.

3. The method of claim 1, further comprising, notifying an operator of the vehicle based on the slope prior to the safety system being engaged.

4. The method of claim 1, further comprising, sending the slope to a controller.

5. The method of claim 1, further comprising, sending the acceleration vs slip to a server computer to warn other vehicles about surface friction.

6. The method of claim 1, further comprising, indicating a tire-health to an operator of the vehicle based on the slip, the tire-health being deteriorated in response to the slip vs acceleration being below a predetermined safety threshold.

7. A system for proactively estimating tire-road friction in a vehicle, prior to engagement of a safety system of the vehicle proactively, the system comprising:
   one or more sensors;
   an autonomous controller configured to maneuver the vehicle autonomously; and
   a friction processor coupled with the one or more sensors, and the autonomous controller, the friction processor configured to:
     compute a slip for the vehicle based on one or more wheel speeds, acceleration, and tire pressure measurement, wherein the slip is a lateral slip is computed as:

$$-\arctan\frac{\int a_y dt}{|\int a_x dt|},$$

where $a_y$ is the lateral acceleration, and $a_x$ is the longitudinal acceleration;
     determine a slope ($\alpha$) as indicator of tire-road friction for the vehicle based on the acceleration and the slip;
     causing the autonomous controller of the vehicle to adjust vehicle kinematics according to the slope ($\alpha$); and
     indicate a tire-health to an operator of the vehicle based on the slope, the tire-health being deteriorated in response to the slope being below a predetermined safety threshold.

8. The system of claim 7, wherein determining the slope comprises determining a slope of a line on a plot for the acceleration vs the slip, the line being drawn on the plot from the origin to a point represented by present values of the acceleration and the slip.

9. The system of claim 7, wherein the autonomous controller is further configured to send the slope and a weight of the vehicle to a second controller associated with a second vehicle.

10. The system of claim 7, the autonomous controller further configured to send the slope and a weight of the vehicle to a server computer to warn other vehicles about the tire-road friction.

11. A vehicle controller for proactively estimating tire-road friction in a vehicle, prior to engagement of a safety system of the vehicle proactively, the vehicle controller configured to:
   compute a slip for the vehicle based on one or more wheel speeds, an acceleration, and a tire pressure measurement;
   determine a slope ($\alpha$) as indicator of tire-road friction for the vehicle based on the acceleration and the slip;
   adjust, autonomously, vehicle kinematics according to the slope ($\alpha$);
   estimate a road surface type based at least in part on the slope ($\alpha$);

determine a condition of at least one tire of the vehicle based at least in part on the slope ($\alpha$); and broadcast, by the vehicle controller using an inter-vehicles communications network, the road surface type to one or more neighboring vehicles.

12. The vehicle controller of claim 11, wherein the slip is a longitudinal slip computed as $$\frac{\omega R - V}{V}$$

during braking, and as $$\frac{\omega R - V}{\omega R}$$

during acceleration, where V is a vehicle speed, $\omega$ is the wheel speed and R is the effective radius of the wheel based on the tire pressure measurement and estimation of the vehicle's weight.

13. The vehicle controller of claim 11, wherein the slip is lateral slip that is computed as:

$$-\arctan \frac{\int a_y dt}{|\int a_x dt|},$$

where $a_y$ is the lateral acceleration, and $a_x$ is the slip.

14. The vehicle controller of claim 11 further configured to send the slope and weight of the vehicle to a server computer to warn other vehicles about the tire-road friction.

15. The vehicle controller of claim 11 further configured to indicate a tire-health to an operator of the vehicle based on the slope, the tire-health being deteriorated in response to the slope being below a predetermined safety threshold.

* * * * *